United States Patent [19]
Wang

[11] Patent Number: 5,505,879
[45] Date of Patent: *Apr. 9, 1996

[54] CHARGE TRANSFER COMPLEXES

[75] Inventor: Ying Wang, Wilmington, Del.

[73] Assignee: E. I. Du Pont de Nemours and Company, Wilmington, Del.

[*] Notice: The term of this patent shall not extend beyond the expiration date of Pat. No. 5,250,378.

[21] Appl. No.: 404,073

[22] Filed: Mar. 14, 1995

Related U.S. Application Data

[63] Continuation of Ser. No. 148,128, Nov. 5, 1993, abandoned, which is a continuation of Ser. No. 730,154, Jul. 15, 1991, abandoned.

[51] Int. Cl.$^6$ .............................. F21V 9/00; H01C 13/00
[52] U.S. Cl. .................... 252/582; 252/501.1; 359/328
[58] Field of Search ...................... 252/582, 587, 252/589, 500, 501.1; 359/326, 328, 329, 885; 385/122; 430/56

[56] References Cited

U.S. PATENT DOCUMENTS

| | | | |
|---|---|---|---|
| 4,792,208 | 12/1988 | Ulman | 252/582 |
| 5,114,477 | 5/1992 | Mort et al. | 106/20 |
| 5,172,278 | 12/1992 | Tutt | 359/885 |
| 5,177,248 | 1/1993 | Chiang et al. | 560/86 |
| 5,178,980 | 1/1993 | Mort et al. | 430/58 |
| 5,250,378 | 10/1993 | Wang | 359/328 |

FOREIGN PATENT DOCUMENTS 301551   2/1989   European Pat. Off. .

OTHER PUBLICATIONS

Hawkins et al., Journal of Organic Chemistry, vol. 55, No. 26, pp. 6250–6252, (1990).
Kamat, Journal of the American Chemical Society, vol. 113, No. 25, pp. 9705–9707, (1991).
Wang et al., J. Phys. Chem., 96, No. 4, 1530–1532, 1992.
Wang, J. Phys. Chem., vol. 96, No. 2, 764–767, 1992.
J. W. Verhoeven et al., Recl. Trav. Chim. Pays–Bas, vol. 110, 349–350, 1991.
T. Pradeep et al., Proc. Indian Acad. Sci. (Chem. Sci.), vol. 103, No. 5, 685–689, 1991.
O. Ermer, Helvetia Chemica Acta, vol. 74, 1339–1351, 1991.
R. E. Haufler et al., J. Phys. Chem., vol. 94, No. 24, 8634–8636, 1990.
P. M. Allemand et al., J. Amer. Chem. Soc., vol. 113, 1050–1051, 1991.
Allen, New Scientist, 59–63, 1989.
Foster, Organic Charge–Transfer Complexes, Academic Press New York, 1969.
Weller, Exciplex, Gordon (Ed.), W. R. Ware, Academic Press, New York, 1975.
Franken et al., Physical Rev. Letters, 7, 118–119, 1961.
Hawkins et al., J. Org. Chem., 55, 6250–6252, 1990.
Kamat, JACS, 113, 9705–9707, 1991.

Primary Examiner—Philip Tucker

[57] ABSTRACT

The disclosed invention relates to novel charge complexes comprising fullerenes and electron donating components such as N,N-diethylaniline. These charge complexes are suitable for forming into optical elements that display improved non-linear optical properties.

14 Claims, 1 Drawing Sheet

CHARGE TRANSFER COMPLEXES

This is a continuation of application Ser. No. 08/148,128, filed Oct. 5, 1993, now abandoned, which is a continuation of Ser. No. 07/730,154, filed Jul. 15, 1991, now abandoned.

FIELD OF THE INVENTION

This invention relates to optical elements, and compositions for use in such optical elements, which exhibit effects attributable to the nonlinear optical properties of the element. More specifically, the invention relates to optical elements containing a transmission medium comprising polar aligned noncentrosymmetric molecular dipoles formed from charge-transfer complexes having an electron donor moiety and an electron acceptor moiety.

BACKGROUND OF THE INVENTION

The growing demand for materials possessing nonlinear optical properties for uses ranging from optical communications to optical storage and retrieval has spurred the search for materials ever since the discovery of nonlinear optic phenomena several decades ago. A useful description of the development of nonlinear optic materials was written by S. Allen in New Scientist, pp. 59–63, July 1, 1989. It is pointed out therein that while several crystalline inorganic compounds are known to possess sufficient nonlinearity for a variety of uses. Organic compounds, which often have much higher nonlinearities, hold the potential for more efficient use. Furthermore, nonlinearity can be designed into a given organic molecule by selecting an effective combination of electron donating and electron accepting groups, as taught, for example, by Ulman et al., U.S. Pat. No. 4,792,208. Such nonlinear organic molecules, when dispersed in polymeric binders, can have the additional advantages of ease of manufacture into a wide variety of shapes and low susceptibility to damage in use.

Second order nonlinear optical phenomena such as SHG (second harmonic generation), sum and difference frequency generation, parametric processes and electro-optical effects, all arise from the second order polarization susceptibility $\chi^{(2)}$. For significant nonlinear optical phenomena it is desirable that a molecule possess a large hyperpolarizability, $\beta$, and that the macroscopic form of the molecule, that is, the ensemble of such molecules, possess a large $\chi^{(2)}$.

Media that have a polarization susceptibility have been recognized as providing manipulating beams of incident electromagnetic radiation. Such media are said to possess nonlinear polarization. The effects attributable to such nonlinear polarization are a property of the medium. To obtain the highest nonlinear polarization property, the molecules within the medium must be arranged so that the nonlinear properties of the individual polar molecules within the medium do not cancel each other out.

Polar molecules may exist in the form of charge-transfer complexes. Charge transfer complexes generally are known in the art. See "Organic Charge-Transfer Complexes", R. Foster, Academic Press, New York, 1969, and A. Weller, "Exciplex" edited by M. Gordon; W. R. Ware, Academic Press, N.Y., 1975. A charge-transfer complex, as known in the art, is formed by interaction of two or more component molecules which are in reversible equilibrium with its components. No covalent bonding exists between the components. Charge transfer complexes are bound together by the partial donation of electrons from at least one component molecule to at least one other component molecule.

On a molecular level the polarization of a nonlinear optical material can be described by the expression:

$$\mu=\mu_0+\alpha E+\beta EE+\gamma EEE+\ldots$$

where:

$\mu$ is the induced dipole moment of the molecule;

$\mu_0$ is the permanent dipole moment of the molecule; and

E is an applied electric field.

Coefficients $\alpha$, $\beta$, and $\gamma$ are tensors that represent linear, second order and third order polarizabilities, respectively. First order or linear polarization is described by $\alpha E$; second order or first nonlinear polarization by $\beta EE$; and third order or second nonlinear polarization by $\gamma EEE$.

The polarization of an ensemble of molecules induced by an applied electric field is described by the expression:

$$P=P_0+\chi^{(1)}E+\chi^{(2)}EE+\chi^{(3)}EEE+\ldots$$

where:

P is the induced polarization in the ensemble of molecules;

$P_o$ is the permanent polarization in the ensemble of molecules; and

E is the applied electric field.

Coefficients $\chi^{(1)}$, $\chi^{(2)}$ and $\chi^{(3)}$ are tensors that represent linear, second order and third order polarization susceptibilities, respectively.

$\chi^{(2)}$ arises from the second order molecular polarizability or first hyperpolarizability, $\beta$, and $\chi^{(3)}$ arises from further higher order hyperpolarizabilities. As tensor quantities, the susceptibilities, $\chi^{(i)}$, depend on the symmetry of the molecular ensemble; odd order susceptibilities are nonvanishing for all materials, whereas even order susceptibilities such as $\chi^{(2)}$, are nonvanishing only for noncentrosymmetric materials.

Franken et al., Physical Review Letters, 7, 118–119 (1961), disclose the observation of second harmonic generation (SHG) upon the projection of a pulsed ruby laser beam through crystalline quartz. The use of a laser remains the only practical way to generate an E large enough to be able to detect the SHG phenomenon.

Although organic molecules are known to possess optical non-linearity, the need exists for organic molecules which exhibit exceptionally high second order molecular polarizabilities relative to conventional nonlinear optically active organic materials. Such materials, in accordance with the invention, can be made into nonlinear optic elements useful in a wide variety of applications requiring high nonlinearity.

SUMMARY OF THE INVENTION

This invention provides for a charge-transfer complex formed of an electron accepting component selected from at least one fullerene compound having from 20 to 1000 carbons, preferably from 60 to 70 carbons, and an electron donating component. The ratio of electron donating component:fullerene component can range from 1:3 to 6:1, most preferably from 1:1 to 3:1. In charge-transfer complexes that have fullerenes with sixty carbons, the electron donating component may be any organic molecule whose oxidation potential is less than 1.38 V against Ag/Ag$^+$. In charge complexes that have fullerenes with seventy carbons, the electron donating components may be any organic molecule whose oxidation potential is less than 1.29 V against Ag/Ag$^+$. A most preferred electron donating component is N,N-diethyl-aniline.

This invention also provides for nonlinear optical elements comprising the charge-transfer complex as used foe nonlinear devices that contain those elements of the invention and a nonlinear optical device utilizing the nonlinear optical element.

DETAILED DESCRIPTION OF THE INVENTION

Figure 1:
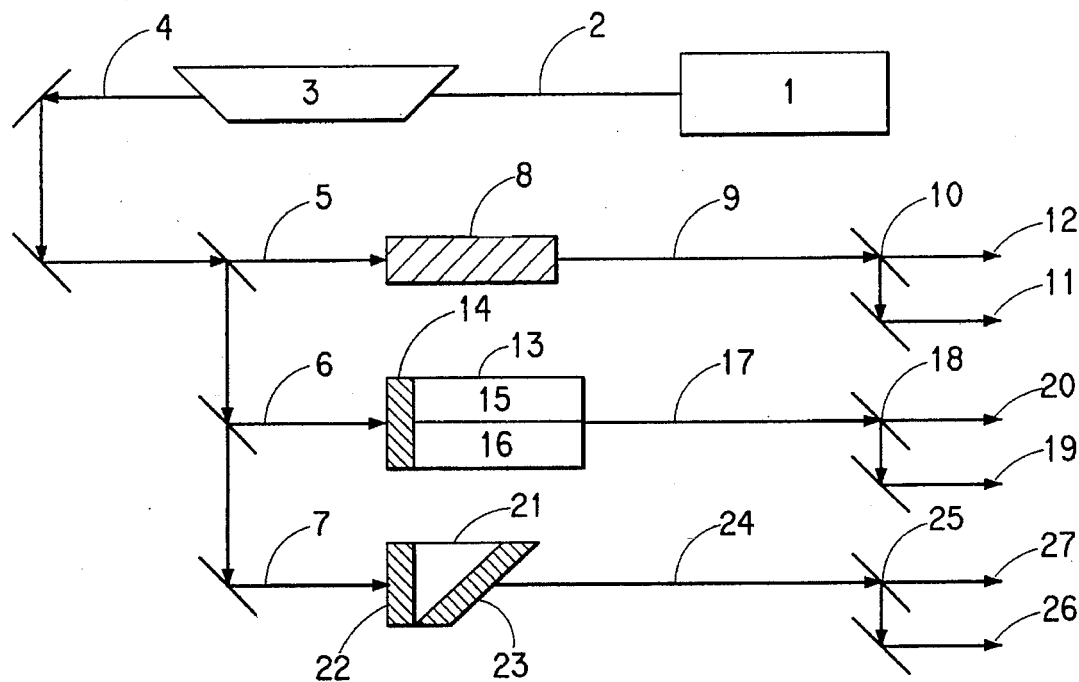
FIG. 1 is a schematic view of the apparatus for determining field induced second harmonic generation in the optical elements of the invention.

Having briefly summarized the invention, the invention will now be described in detail by reference to the following specification and non-limiting examples. Unless otherwise specified, all percentages are by weight and all temperatures are in degrees Celsius.

Generally, the charge-transfer complexes of this invention are made by first dissolving individual electron donating and electron accepting components in separate solvents to provide solutions, and then mixing those solutions. Alternatively, one component can be dissolved in a solvent, followed by addition of other components. The properties of charge-transfer complexes can be measured either in solution, or as solids precipitated from solution by the addition of a poor solvent. In the case of fullerene/N,N-diethylaniline complexes, methanol or ethanol can be used to precipitate the charge-transfer complexes. Properties of the complexes can be determined by methods known in the art, such as EFISH (electric field induced second harmonic generation).

The complexes can be prepared as thin films either by sublimation of the solids or by slowly evaporating a solution of the complex onto a substrate such as glass. Such methods are known in the art. The complexes can also be doped into polymers such as polycarbonate, and cast into thin films by spin-coating as is known in the art. See, for example, U.S. Pat. No. 4,692,636.

The formation of a charge-transfer complex in accordance with this invention is accompanied by the appearance of a new charge-transfer absorption band in either the ultraviolet, infra-red or visible absorption spectrum. This new absorption band corresponds to the transition of the components to an excited state where a more complete transfer of electrons from the electron donor to the electron acceptor occurs. The formation of a charge-transfer complex can therefore be detected by the change of the absorption spectrum of the electron accepting component when mixed with the electron donating component.

In order to form the charge-transfer complex, the energy of the charge-transfer complex, $E^{CT}$, should be lower than the first excited state energy of either the electron donor, $E^D$, or the electron acceptor, $E^A$, that is, $$E^{CT} < E^D \text{ or } E^A \qquad (1)$$

The first excited energy state of the donor or the acceptor can be obtained from the first peak of their absorption spectra. The energy of the charge-transfer complex is determined by Equation (2):

$$E^{CT} = E_{ox}^D - E_{red}^A + 0.32 \pm 0.1 \text{ V} \qquad (2)$$

Equation 2 is set forth in A. Weller, "Exciplex", edited by M. Gordon; W. R. Ware, Academic Press, N.Y., 1975.

As set forth in Equation (2), $E_{ox}^D$ is the oxidation potential of the donor and $E_{red}^A$ the reduction potential of the acceptor. Both the oxidation and reduction potential can be determined experimentally by electrochemical methods. See, for example, Siegerman, in "Techniques of Electroorganic Synthesis" Part II, ed. N. L. Weinberg, in "Techniques of Chemistry", Vol. V, John-Wiley & Sons, New York, 1975.

The fullerene electron acceptor component useful in the charge-transfer complexes of this invention can be made by the procedures described by Kratschmer et al., *Nature*, pp. 347–354 (1990), the disclosure of which is incorporated by reference. Kratschmer et al. describe the fullerene molecule as a centrosymmetric truncated icosahedron. Pure solid fullerene consists of a somewhat disordered hexagonal close packing of the centrosymmetric molecules. Electrochemical studies on fullerenes, e.g., Haufler et al., J. Phys. Chem., vol. 94, pp. 8634–8636 (1990) and Allemand et al., J. Am. Chem. Soc., Vol. 113, pp. 1050–1051 (1991), indicate the $C_{60}$ and $C_{70}$ clusters known as fullerenes are excellent electron acceptors.

The fullerene component may have an extremely broad range of carbon atoms. Useful fullerenes may have 20–1000 carbon atoms. Preferably, the fullerene has 60 to 70 carbon atoms. Other examples of fullerenes that may be used to form the charge complexes of the invention are described in Zhang et al, J. Phys. Chem. Volume 90, page 525 (1986); Newton et al, J. Am. Chem. Soc., Volume 106, p. 2469 (1984); Fowler, Chem. Phys. Lett., Volume 131, page 444–450 (1986), Diederich et al., Science, Volume 252, pages 548–551 (1991). It is also permissible to utilize any substituted form of fullerene, provided that the substituted fullerene retains its electron accepting character.

The electron donating component of the charge-transfer complex of the invention is preferably an organic compound which is electron donating in character. Electron donating components are well known in the art generally. Electron donating components useful in forming charge-transfer complexes with electron accepting compounds are pointed out in A. Weller and R. Foster referred to above. N,N-diethylaniline is particularly preferred as an electron donating component for reasons of economics and ease of availability. However, other suitable electron donating components include polycyclic aromatics, particularly anthracene and pyrenes, amines such as N,N-dimethylaniline, stilbene derivatives such as trans-stilbene, metallocenes such as ferrocene, and paracyclophanes such as [2,2] paracyclophane. Representative examples of electron donating components that may be used to form the charge-transfer complexes of this invention are shown in Foster, Organic Charge-Transfer Complexes, p. 69, Ed. Blomquart, (1969), the disclosure of which is incorporated herein by reference.

The choice of electron donating component depends on the oxidation potential of the electron donating component. The oxidation potential obeys the relationship defined in eq. (1) and (2). For $C_{60}$ and $C_{70}$ fullerene electron acceptor components, the first reduction potentials $E_{red}^A$, have been determined to be −0.4 V against Ag/Ag$^+$ electrode (Haufler et al., J. Phys. Chem., Vol. 94, pages 8634–8636 (1990) and Allemand et al., J. Am. Chem. Soc., Vol 113, pages 1050–1051 (1991)). The first excited state energies of $C_{60}$ and $C_{70}$ fullerenes have been determined to be 2.0 eV and 1.91 eV, respectively, from their absorption spectra where the first peak of the absorption spectra corresponds to the first excited state. Electron donors useful with $C_{60}$ and $C_{70}$ fullerenes therefore show $E_{ox}{}^D < 1.38$ V against Ag/Ag$^+$ for $C_{60}$ $E_{ox}{}^D < 1.29$ V against Ag/Ag$^+$ for $C_{70}$ The value of $E_{ox}{}^D$ can be routinely measured electrochemically against standard electrodes such as Ag, saturated calomel, or normal hydrogen. Siegerman referred to above discusses techniques for measuring $E_{ox}{}^D$ and provides a list of oxidation potentials of common organic molecules.

The charge-transfer complexes provided in accordance with this invention can be utilized per se as nonlinear optical elements or can be utilized as components of nonlinear optical elements. Other possible uses include, for example, photoconductors, visible and infrared sensitizers, initiators for photopolymerization, reinforcement of polymers and pigments.

The optical elements described herein are particularly useful in optical devices requiring second harmonic generation (SHG). Second harmonic generation may be used, for example, to vary the frequency of a diode laser, for information control in optical circuitry, optical switches, and the like.

The preferred charge-transfer complexes of this invention exhibit very high second order molecular polarizability and rank among the highest reported for organic compounds to date. For example, the second order molecular polarizability, $\beta$, of a complex of a 60-carbon fullerene and N,N-diethylaniline, as measured by the EFISH technique described below with a fundamental laser wavelength of 1.91 mm, is $2\pm0.7\times10^{-28}$ esu. These charge-transfer complexes therefore are 3 times more nonlinear than 4-N,N-dimethylamino-4'-nitrostilbene ($\beta=7.3\times10^{-29}$ esu) which is one of the most nonlinear organic compounds known.

The optical elements provided in accordance with the invention may be in a variety of forms. For example, the optical element may be a crystal of the charge-transfer complex, provided that the complex is in the form of crystals in which the polar molecules are in polar alignment. Such crystals may be grown under equilibrium conditions with their mother liquor, such as by allowing solvent to slowly evaporate.

The optical elements of the invention also may be in the form of solutions. These elements are made by dissolving the charge-transfer complex in a solvent, to provide a solution placed in a container of the desired shape of the optical element. The solution is subjected to an electrical field to cause the dissolved dipoles of the complex to align in the field. In addition, and as an alternative, electromagnetic radiation can be passed through the solution to yield nonlinear optical effects, such as second harmonic generation. Such methods are known in the art. See, for example, L. T. Cheng et al., *SPIE*, vol. 1147 (1989).

A preferred form of optical element in accordance with the invention can be made by dispersing the charge-transfer complexes into a polymeric binder. The complexes can be mixed into the polymeric binder. Alternativly, if the polymer binder contains one of the components of the complex, the complex can be grafted onto the polymer. The resulting mixture can be heated to a temperature at which the polymer becomes sufficiently soft to enable an applied electrical field to align the polar complexes in the direction of the field. Upon cooling, the polar complexes are locked into their aligned positions in the polymers, after which the electric field can be removed. Suitable polymeric binders should desirably be transparent and stable at temperatures of use. Useful polymers include polymethacrylate, poly (methyl methacrylate), poly (vinyl alcohol), copolymers of methyl methacrylate and methacrylic acid, copolymers of styrene and maleic anhydride and half ester-acids of the latter, polycarbonate. Particularly preferred polymeric binders are fully optically transparent so that the transparency of the charge complexes utilized in this invention can be advantageously employed.

FIG. 1 is a schematic view of the apparatus used for EFISH and THG (third harmonic generation) measurements. As shown in FIG. 1, a 20 Hz Nd:YAG laser 1 provides 10 ns pulses of 0.4 J energy. The 1.06 μm output of laser 2 pumps a hydrogen Raman shifter 3 which provides up to 120 mW of Stokes radiation 4 at a frequency of 1.91 μm. Stokes radiation with harmonic wavelengths at 954 nm and 636 nm 4 serves as the fundamental frequency for both the EFISH and THG measurements, respectively. The Stokes radiation is divided into three beams 5, 6, and 7. Beam 5 is passed through reference channel 8 constructed of a nonlinear crystalline material such as quartz. Exiting beam 9 is separated by dichroic mirrors 10 into second and third harmonic signals, 11 and 12, to measure normalization intensity.

Beam 6 is passed through an amplitude cell 13 that contains a 2 cm thick front window 14 and is divided into sections 15 and 16. Section 15 contains a liquid of known optical properties such as toluene. Section 16 contains a solution of a complex useful in the invention in an appropriate solvent such as p-dioxane or chloroform. Gold electrodes are fabricated at the window-liquid interface so that both EFISH and THG measurements can be carried out concurrently in accordance with the procedure described in L. T. Cheng et al., *SPIE* Vol. 1147 (1989). Resulting beam 17 is separated by dichroic mirrors 18 into second and third harmonic signals, 19 and 20, for measurement of harmonic amplitude.

Beam 7 is directed through a wedge shaped cell 21 provided with a quartz front window 22 that contains a solution of a complex useful in this invention in section 16 for measurement of the coherence lengths. Resulting beam 23 is separated by dichroic mirrors 24 into second and third harmonic signals 25 and 26. Where absorbance is at 633 nanometers, no SHG signal is collected.

The nonlinear optical device according to the invention comprises a means to direct at least one incident beam of electromagnetic radiation onto an optical element that has nonlinear optical properties. Electromagnetic radiation emerging from the element contains at least one frequency that differs from the frequency of the incident beam of radiation. That different frequency is an even multiple of the frequency of one incident beam of electromagnetic radiation. Preferably, the emerging radiation of the different frequency is doubled, that is SHG. The optical element employed in the device is selected from one of the forms described above.

Figure 2:
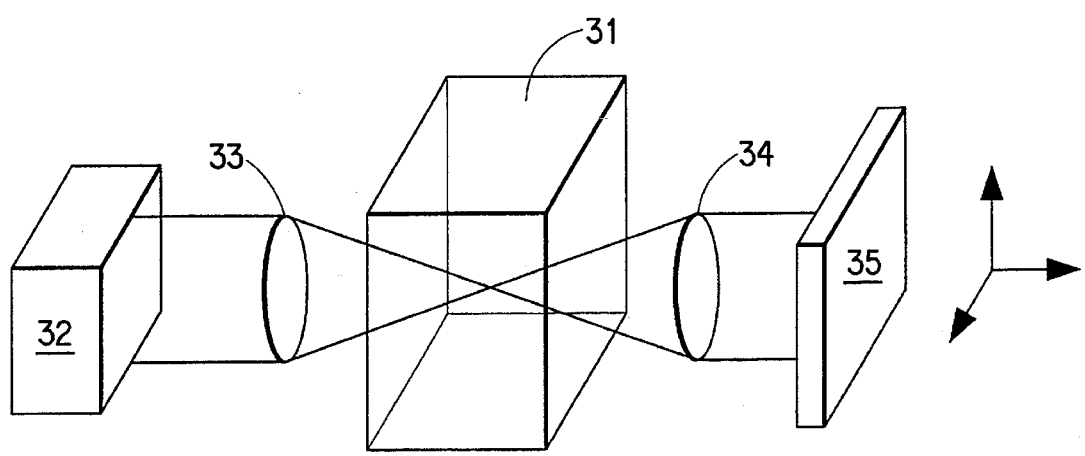
FIG. 2 is a schematic view of a nonlinear optical device according to the invention.

Referring to FIG. 2, optical element 31 is oriented to achieve at least partially maximized SHG by virtue of phase matching. The specific orientation of the optical element is chosen for reasons such as maximum nonlinearity and increased angular acceptance. As shown in FIG. 2, polarized light, for example, of wavelength 1.06μ from a Nd YAG laser 32, is incident on optical element 31 along the optical path. Lens 33 focuses the polarized light into optical element 31. Light emerging from optical element 31 is collimated by lens 34 that is similar to lens 33, and passed through filter 35 to remove light of the incident wavelength, 1.06μ while passing light of ½ the wavelength of the incident light, 0.53μ.

The optical elements of the invention can be utilized in an electro-optic modulator, wherein an electric field is applied to the optical element to modify the transmission properties of the element.

Without further elaboration, it is believed that one skilled in the art can, using the preceding description, utilize the present invention to its fullest extent. The following preferred specific embodiments are, therefore, to be construed as merely illustrative, and not limiting of the of the disclosure in any way whatsoever.

Preparation of Fullerenes

In accordance with the methods set forth in Kratschmer et al., $C_{60}$ and $C_{70}$ fullerenes are prepared. ⅛" graphite rods are evaporated in a Denton DV-502 Evaporator under 150 torr of helium by passing electrical currents of 120 amperes at 20 volts through the rods. The black soot generated is collected and then extracted with toluene in a Soxhlet tube to obtain fullerenes containing mixtures of $C_{60}$, $C_{70}$ and small amount of impurities. To separate the $C_{60}$ and $C_{70}$ fullerenes, mixtures of these fullerenes are dissolved in either hexane, 5% toluene/hexane, or 20% toluene/hexane. The resulting solution is passed through a column containing neutral alumina. $C_{60}$ (purple color) comes out of the column first, followed by $C_{70}$ (orange brown).

EXAMPLES

Example 1

Preparation of $C_{60}$ and $C_{70}$ Charge-Transfer Complexes

Fullerene/N,N-diethylaniline charge-transfer complexes are formed by dissolving fullerenes into N,N-diethylaniline. The charge-transfer complexes are precipitated as solids by adding methanol to the solution. Formation of the $C_{60}$ and $C_{70}$ charge-transfer complexes is demonstrated by the appearance of a new, red-shifted, charge-transfer absorption band in the visible absorption spectra of $C_{60}$ and $C_{70}$ fullerenes. The $C_{70}$/N,N-diethylaniline charge-transfer complexes also display a 828 nm luminescence band at 77K. This band is different from the parent $C_{70}$ luminescence.

Determination of Equilibrium

Constant for the $C_{60}$ Charge-Transfer Complex

In accordance with art known techniques such as that set forth in K. A. Connors, "Binding Constants. The Measurement of Molecular Complex Stability", John Wiley & Sons, New York, 1987, the equilibrium constant of $C_{60}$/N,N-diethylaniline charge-transfer complex is determined by studying the dependence of its absorption spectra as a function of the concentration of N,N-diethylaniline. Assuming 1:1 stoichiometry of $C_{60}$ fullerene to N,N-diethylaniline, the equilibrium constant is determined to be 0.18±0.04. The extinction coefficient of the charge-transfer complex at 600 nm is determined from the optical density of the absorption spectra to be 3690 $M^{-1}$ $cm^{-1}$ in N,N-diethylaniline.

Determination of Equilibrium

Constant for the $C_{70}$ Charge-Transfer Complex

In accordance with art known techniques such as that set forth in K. A. Connors, "Binding Constants. The Measurement of Molecular Complex Stability", John Wiley & Sons, New York, 1987, the equilibrium constant of $C_{70}$/N,N-diethylaniline charge-transfer complex is determined by studying the dependence of the absorption spectra of the complex as a function of the concentration of N, N-diethylaniline. Assuming 1:1 stoichiometry of $C_{70}$ fullerene to N,N-diethylaniline, the equilibrium constant is determined to be 0.4±0.06. The extinction coefficient of the charge-transfer complex at 468 nm is determined from the optical density of the absorption spectrum to be $1.6 \times 10^{-4}$ $M^{-1}$ $cm^{-1}$ in N, N-diethylaniline.

EFISH Studies of the $C_{60}$ Charge-Transfer Complex

As set forth in L. T. Cheng mentioned above, electrical-field-induced-second-harmonic (EFISH) generation is performed. This is done with $1.2 \times 10^{-2}$ M Molar $C_{60}$ in N,N-diethylaniline solution. The second order polarizability and the dipole moment product, $\beta\mu$, is determined to be $9 \times 10^{-46}$ esu.

From the foregoing description, one skilled in the art can easily ascertain the essential characteristics of this invention, and without departing from the spirit and scope thereof, can make various changes and modifications of the invention to adapt it to various uses and conditions.

What is claimed is:

1. A charge-transfer complex consisting essentially of a fullerene having from about 20 to about 1000 carbons which is an electron acceptor from an electron donating component selected from the group consisting of polycyclic aromatics, amines, stilbenes, metallocenes and paracyclophanses wherein the energy of the charge transfer-complex, $E^{CT}$, is lower than the first excited state energy of either the electron donor, $E^D$, or the electron acceptor, $E^A$, and wherein the oxidation potential of the electron donor minus the reduction potential of the electron acceptor plus 0.32±0.1 equals $E^{CT}$.

2. The charge-transfer complex of claim 1 wherein said fullerene has at least sixty carbon atoms.

3. The charge-transfer complex of claim 1 wherein said electron donating component has an oxidation potential less than about 1.38 volts measured against Ag/Ag$^+$.

4. The charge-transfer complex of claim 2 wherein said electron donating component has an oxidation potential less than about 1.29 volts measured against Ag/Ag$^+$.

5. The charge-transfer complex of claim 1 wherein the ratio of said electron donating component to said fullerene is in the ratio of about 1:3 to 6:1.

6. The charge-transfer complex of claim 5 wherein the ratio of said electron donating component to said fullerene is in the ratio of about 1:1 to 3:1.

7. A charge-transfer complex consisting essentially of a fullerene having either sixty or seventy carbon atoms, and an electron donating component which is N,N-diethylaniline, and the ratio of said N,N-diethylaniline to said fullerene is in the range of from about 1:1 to 3.1, and wherein the energy of the charge transfer complex, $E^{CT}$, is lower than the first excited state energy of either the electron donor, $E^D$, or the electron acceptor, $E^A$, and wherein the oxidation potential of the electron donor minus the reduction potential of the electron acceptor plus 0.32±0.1 equals $E^{CT}$ 8. A charge-transfer complex consisting essentially of a fullerene having from about 20 to about 1000 carbons which is an electron acceptor from an electron donating component selected from the group consisting of polycyclic aromatics, amines, stilbenes, metallocenes and paracyclophanses wherein the energy of the charge transfer-complex, $E^{CT}$, is lower than the first excited state energy of either the electron donor, $E^D$, or the electron acceptor, $E^A$, and wherein the oxidation potential of the electron donor minus the reduction potential of the electron acceptor plus 0.32±0.1 equals $E^{CT}$ and wherein said complex includes a polymeric binder.

9. The complex of claim 8 wherein said polymer is substantially transparent.

10. The complex of claim 9 wherein said polymer is substantially transparent to ultraviolet and infrared radiation.

11. An optical element containing a transmission medium comprising a charge-transfer complex consisting essentially of a fullerene having from about 20 to about 1000 carbons which is an electron acceptor from an electron donating component selected from the group consisting of polycyclic aromatics, amines, stilbenes, metallocenes and paracyclophanses wherein the energy of the charge transfer-complex, $E^{CT}$, is lower than the first excited state energy of either the electron donor, $E^D$, or the electron acceptor, $E^A$, and wherein the oxidation potential of the electron donor minus the reduction potential of the electron acceptor plus $0.32\pm 0.1$ equals $E^{CT}$.

12. The optical element of claim 11 wherein said transmission medium is in the form of a solution.

13. A nonlinear device comprising means to direct at least one incident beam of electromagnetic radiation onto the optical element of claim 11, wherein electromagnetic radiation that emerges from the optical element is at least one frequency different from and is an even multiple of the frequency of said incident beam of radiation.

14. The device of claim 13 wherein said even multiple is two.

* * * * *